(12) United States Patent
Garcia et al.

(10) Patent No.: US 8,632,435 B2
(45) Date of Patent: Jan. 21, 2014

(54) MULTI-SPEED TRANSMISSION GEAR AND CLUTCH ARRANGEMENT

(71) Applicant: GM Global Technology Operations LLC, Detroit, MI (US)

(72) Inventors: Pete R. Garcia, Troy, MI (US); Tejinder Singh, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/673,539

(22) Filed: Nov. 9, 2012

(65) Prior Publication Data

US 2013/0203542 A1 Aug. 8, 2013

Related U.S. Application Data

(60) Provisional application No. 61/594,627, filed on Feb. 3, 2012.

(51) Int. Cl.
*F16H 3/62* (2006.01)

(52) U.S. Cl.
USPC ........... 475/278; 475/276; 475/277; 475/280; 475/288

(58) Field of Classification Search
USPC ................... 475/276–278, 280, 288
See application file for complete search history.

(56) References Cited

U.S. PATENT DOCUMENTS

| | | | | |
|---|---|---|---|---|
| 2,399,201 A | * | 4/1946 | Buckendale et al. | ........ 74/665 R |
| 4,103,753 A | * | 8/1978 | Holdeman | .................... 180/247 |
| 6,955,627 B2 | * | 10/2005 | Thomas et al. | ............... 475/283 |

* cited by examiner

*Primary Examiner* — Derek D Knight

(57) ABSTRACT

A transmission includes an input member, an output member, at least four planetary gear sets, a plurality of coupling members and a plurality of torque transmitting devices. Each of the planetary gear sets includes first, second and third members. The torque transmitting devices include clutches and brakes that are actuated in various combinations to establish a plurality of forward gear ratios and a reverse gear ratio.

16 Claims, 3 Drawing Sheets

|      |        |       | 38 | 34 | 36 | 26 | 28 | 32 | 30 |
|------|--------|-------|----|----|----|----|----|----|----|
| Rev  | -2.940 |       |    |    | X  | X  |    |    |    |
| N    |        | -0.64 |    |    |    |    |    |    |    |
| 1st  | 4.585  |       | X  |    | X  |    |    |    |    |
| 2nd  | 2.966  | 1.55  | X  | X  |    |    |    |    |    |
| 3rd  | 2.624  | 1.13  | X  |    |    |    |    | X  |    |
| 4th  | 2.415  | 1.09  | X  |    |    |    |    |    | X  |
| 5th  | 1.913  | 1.26  | X  |    |    | X  |    |    |    |
| 6th  | 1.446  | 1.32  | X  |    |    |    | X  |    |    |
| 7th  | 1.000  | 1.45  |    |    |    | X  | X  |    |    |
| 8th  | 0.904  | 1.11  |    |    |    |    | X  | X  |    |
| 9th  | 0.746  | 1.21  |    | X  |    |    | X  |    |    |
| 10th | 0.621  | 1.20  |    |    |    | X  |    | X  |    |

*Fig-2*

MULTI-SPEED TRANSMISSION GEAR AND CLUTCH ARRANGEMENT

RELATED APPLICATION

This application claims the benefit of U.S. Provisional Application No. 61/594,627, filed Feb. 3, 2012, the entire contents of which are incorporated herein by reference.

FIELD

The present invention relates to a multi-speed transmission. More specifically, the present invention relates to a gear and clutch arrangement for a multi-speed transmission.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission includes an input member, an output member, at least four planetary gear sets, a plurality of coupling members and a plurality of torque transmitting devices. Each of the planetary gear sets includes first, second and third members. The torque transmitting devices include clutches and brakes that are actuated in various combinations to establish a plurality of forward gear ratios and a reverse gear ratio.

In one arrangement, the transmission includes an input member and an output member, a plurality of gear assemblies, a plurality of torque-transmitting mechanisms, a torque convertor, and a transfer mechanism. At least one of the plurality of planetary gear assemblies is coupled to the input member and at least another of the plurality of gear assemblies is coupled to the output member. The plurality of torque-transmitting mechanisms are selectively engageable to establish at least ten forward speed ratios and at least one reverse speed ratio with the plurality of gear assemblies and between the input and output members. The torque converter is coupled to the input member, such that the torque converter provides input torque to the input member. The transfer mechanism is coupled to the output member and includes a differential assembly that provides front-wheel drive and all-wheel drive modes to the motor vehicle Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings:

FIG. 2 is a truth table presenting the state of engagement of the various torque transmitting elements in each of the available forward and reverse speeds or gear ratios of the transmission illustrated in FIG. 1.

DETAILED DESCRIPTION

The following description is merely exemplary in nature and is not intended to limit the present disclosure, application, or uses.

At the outset, it should be appreciated that the embodiments of the multi-speed automatic transmissions of the present invention have an arrangement of permanent mechanical connections between the elements of the four planetary gear sets. A second component or element of a first planetary gear set is permanently coupled to a third component or element of the third planetary gear set. A third component or element of the first planetary gear set is permanently coupled a second component or element of the second planetary gear set. A third component or element of the second planetary gear set is permanently coupled to a second component or element of the third planetary gear set and a third component or element of the fourth planetary gear set. A first component or element of the third planetary gear set is permanently coupled to a second component or element of the fourth planetary gear set.

Figure 1:
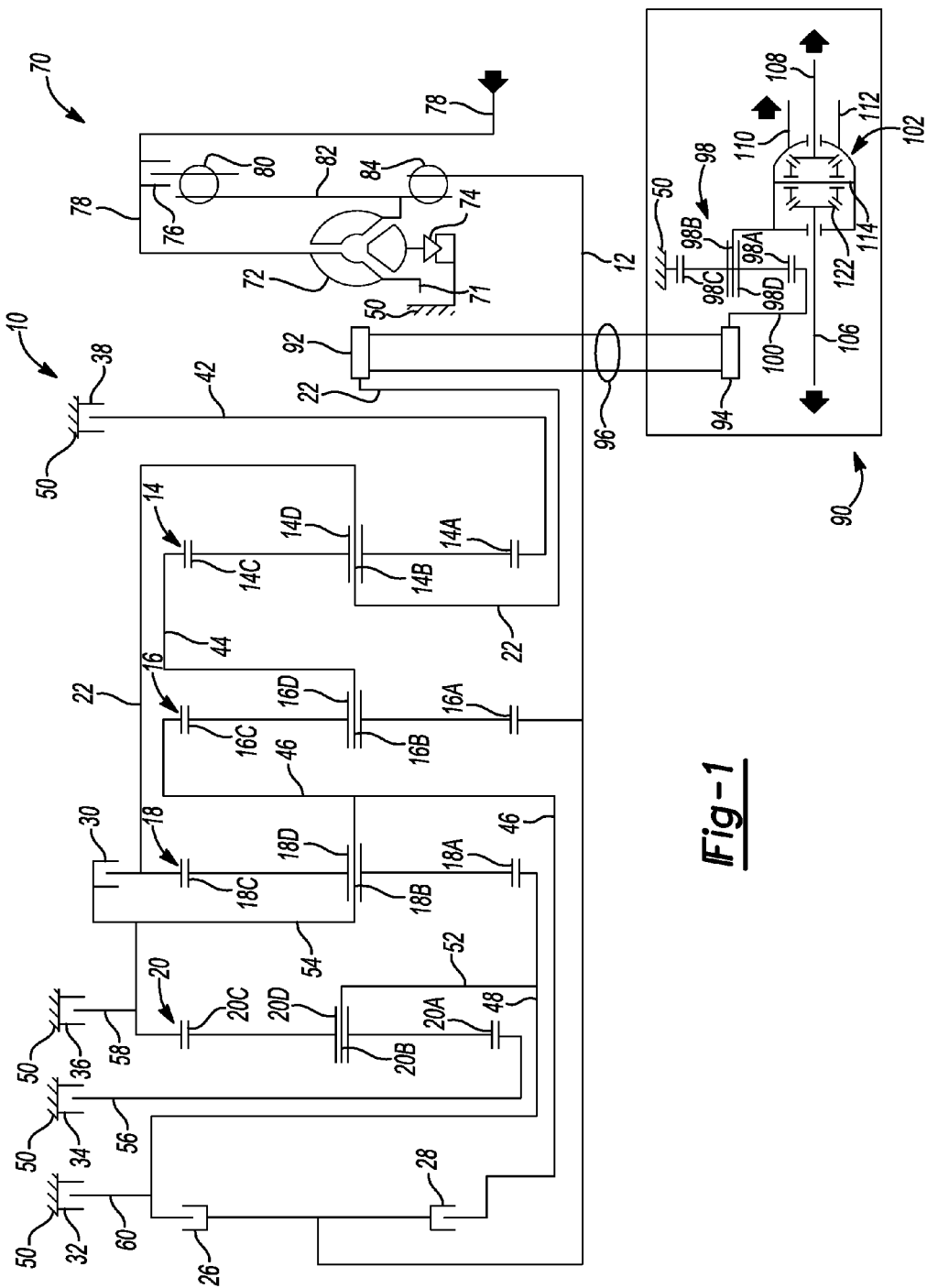
FIG. 1 is a diagrammatic illustration of a transmission with a gear and clutch arrangement in accordance with the principles of the present invention.

Referring now to the drawings, a transmission with a gear and clutch arrangement embodying the principles of the present invention is shown in FIG. 1 and designated at 10. The transmission 10 includes an input shaft or member 12, a first planetary gear set 14, a second planetary gear set 16, a third planetary gear set 18 and a fourth planetary gear set 20 and an output shaft or member 22.

The input member 12 is continuously coupled to the first node 16A of the second planetary gear set 16. The output member 22 is coupled to the second node 14B of the first planetary gear set 14 and the third node 18C of the third planetary gear set 18. The second node 14B of the first planetary gear set 14 is coupled to the third node 18C of the third planetary gear set 18. The third node 14C of the first planetary gear set 14 is coupled to the second node 16B of the second planetary gear set 16. The third node 16C of the second planetary gear set 16 is coupled to the second node 18B of the third planetary gear set 18. The first node 18A of the third planetary gear set 18 is coupled to second node 20B of the fourth planetary gear set 20. The second node 18B of the third planetary gear set 18 is coupled to the third node 20C of the fourth planetary gear set 20.

A first clutch 26 selectively connects the input member or shaft 12 and the first node 16A of the second planetary gear set 16 with the first node 18A of the third planetary gear set 18 and the second node 20B of the fourth planetary gear set 20. A second clutch 28 selectively connects the input member or shaft 12 and the first node 16A of the second planetary gear set 16 with the third node 16C of the second planetary gear set 16, the second node 18B of the third planetary gear set 18 and the third node 20C of the fourth planetary gear set 20. A third clutch 30 selectively connects the third node 20C of the fourth planetary gear set 20 with the third node 18C of the third planetary gear set 18, the second node 14B of the first planetary gear set 14 and the output member 22. The third clutch 30 can be executed in a variety of ways. For example, in various implementations, the third clutch 30 connects any two nodes in either the gear set 18 or any two nodes in the gear set 30. A first brake 32 selectively connects the first node 20A of the fourth planetary gear set 20 with a stationary member or transmission housing 50. A second brake 34 selectively connects the first node 18A of the third planetary gear set 18 and the second node 20B of the fourth planetary gear set 20 with the stationary member or transmission housing 50. A third brake 36 selectively connects the third node 16C of the second planetary gear set 16, the second node 18B of the third planetary gear set 18 and the third node 20C of the fourth planetary gear set 20 with the stationary member or transmission housing 50. The third brake 36 can be a selectable one way clutch.

The planetary gear set 14 includes a sun gear member 14A, a ring gear member 14C and a planet gear carrier member 14B that rotatably supports a set of planet gears 14D. The sun gear member 14A is connected for common rotation with a first shaft or interconnecting member 42. The ring gear member 14C is connected for common rotation with a second shaft or interconnecting member 44. The planet carrier member 14B is connected for common rotation with the output shaft or member 22. The planet gears 14D are each configured to intermesh with both the sun gear member 14A and the ring gear member 14C.

The planetary gear set 16 includes a sun gear member 16A, a ring gear member 16C and a planet gear carrier member 16B that rotatably supports a set of planet gears 16D. The sun gear member 16A is connected for common rotation with the input shaft or member 12. The ring gear member 16C is connected for common rotation with a third shaft or interconnecting member 46. The planet carrier member 16B is connected for common rotation with the second shaft or interconnecting member 44. The planet gears 16D are each configured to intermesh with both the sun gear member 16A and the ring gear member 16C.

The planetary gear set 18 includes a sun gear member 18A, a ring gear member 18C and a planet gear carrier member 18B that rotatably supports a set of planet gears 18D (only one of which is shown). The sun gear member 18A is connected for common rotation with a fourth shaft or interconnecting member 48, a fifth shaft or interconnecting member 52, and a sixth shaft or interconnecting member 60. The ring gear member 18C is connected for common rotation with the output shaft or member 22. The planet carrier member 18B is connected for common rotation with the third shaft or interconnecting member 46 and with a seventh shaft or interconnecting member 54. The planet gears 18D are each configured to intermesh with both the sun gear member 18A and the ring gear member 18C.

The planetary gear set 20 includes a sun gear member 20A, a ring gear member 20C and a planet gear carrier member 20B that rotatably supports a set of planet gears 20D. The sun gear member 20A is connected for common rotation with an eighth shaft or interconnecting member 56. The ring gear member 20C is connected for common rotation with a ninth shaft or interconnecting member 58 and with the sixth shaft or interconnecting member 54. The planet carrier member 20B is connected for common rotation with the fifth shaft or interconnecting member 52, the fourth shaft or interconnecting member 48, and the sixth shaft or interconnecting member 60. The planet gears 20D are each configured to intermesh with both the sun gear member 20A and the ring gear member 20C.

The transmission 10 also includes torque-transmitting mechanisms or clutches 26, 28, 30 and brakes 32, 34, 36 and 38 that allow for selective interconnection of the shafts or interconnecting members, members of the planetary gear sets and the housing. For example, the first clutch 26 is selectively engageable to connect the input shaft or member 12 with the fourth shaft or interconnecting member 48. The second clutch 28 is selectively engageable to connect the input shaft or member 12 with the third shaft or interconnecting member 46. The third clutch 30 is selectively engageable to connect the output shaft or member 22 with the sixth shaft or interconnecting member 54. The first brake 32 is selectively engageable to connect the sixth shaft or interconnecting member 60 with the stationary element or a transmission housing 50 in order to restrict the member 60 from rotating relative to the transmission housing 50. The second brake 34 is selectively engageable to connect the eight shaft or interconnecting member 56 with the stationary element or the transmission housing 50 in order to restrict the member 60 from rotating relative to the transmission housing 50. The third brake 36 is selectively engageable to connect the ninth shaft or interconnecting member 58 with the stationary element or the transmission housing 50 in order to restrict the member 58 from rotating relative to the transmission housing 50. The fourth brake 38 is selectively engageable to connect the first shaft or interconnecting member 42 with the stationary element or the transmission housing 50 in order to restrict the member 42 from rotating relative to the transmission housing 50.

It will be appreciated that transmission 10 is capable of transmitting torque from the input shaft or member 12 to the output shaft or member 22 in at least ten forward speed or torque ratios and at least one reverse speed or torque ratio. Each forward and reverse speed or torque ratio is attained by engagement of one or more of the torque-transmitting mechanisms (i.e. first clutch 26, second clutch 28, third clutch 30, first brake 32, second brake 34, third brake 36 and fourth brake 36). The torque transmitting devices 26, 28, 30, 32, 34, 36, and 38 can be any suitable type of device. For example, they can be friction clutches, clutch bands, dog clutches, or synchronizer mechanisms. The seven torque transmitting devices 26, 28, 30, 32, 34, 36, and 38 can be arranged in any suitable manner to minimize internal package complications. Further, the torque transmitting device 30 can be a bearing type of applied clutch.

FIG. 2 is a truth table presenting the various combinations of torque-transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

It will be appreciated that the foregoing explanation of operation and gear states of the ten speed transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Referring again to FIG. 1, in accordance with the principles of the present invention, the input shaft or member 12 is continuously connected to a torque convertor such as the starting device 70, and the output shaft or member 22 is continuously connected to an output transfer mechanism 90. The starting device 70 includes a torus 72 contained within a housing 71 coupled to the transmission housing 50. The torus 72 is connected to a stator through a one-way clutch 74 that insures that the torus rotates in only one direction. The torus 72 is also connected to the motor vehicle engine by a shaft or member 78. The starting device 70 further includes a dual spring/damper assembly 82 with two spring/dampers 80 and 84. The spring/damper assembly 82 is selectively coupled to the torus 72 with a clutch 76 to minimize vibrations transmission to the transmission 10. Further, torque from the engine is transmitted to the transmission 10 when the clutch 76 is engaged. In other implementations, the starting device 70 can include a fluid clutch that is subjected to a slip effect and optionally provided with a lockup clutch, a wet or dry type friction clutch, or a P2 electric motor device.

The transfer mechanism 90 is coupled to the output shaft or member 22 with a pair of sprockets 92 and 94 connected together with a chain 96. The transfer mechanism 90 includes a planetary gear set with a sun gear member 98A, a ring gear member 98C and a planet gear carrier member 98B that rotatably supports a set of planet gears 98D. The sun gear member 98A is connected for common rotation with a shaft or interconnecting member 100. The ring gear member 98C is connected transmission housing 50. The planet carrier member 98B is connected for common rotation with an open differential such as a pinion/gear assembly 102. The planet gears 98D are each configured to intermesh with both the sun gear member 98A and the ring gear member 98C.

The pinion/gear assembly 102 includes a pin 114 that engages with a set of pinion gears 122 such that torque from the transmission 10 is transmitted through the pinion/gear assembly to a set of axles 106 and 108 that drive the front wheels of the motor vehicle. The transfer mechanism 90 further includes a pair of mechanisms 110 and 112 that engage with respective splines such that the transmission 10 is suitable for use in an all-wheel drive mode.

Figure 3:
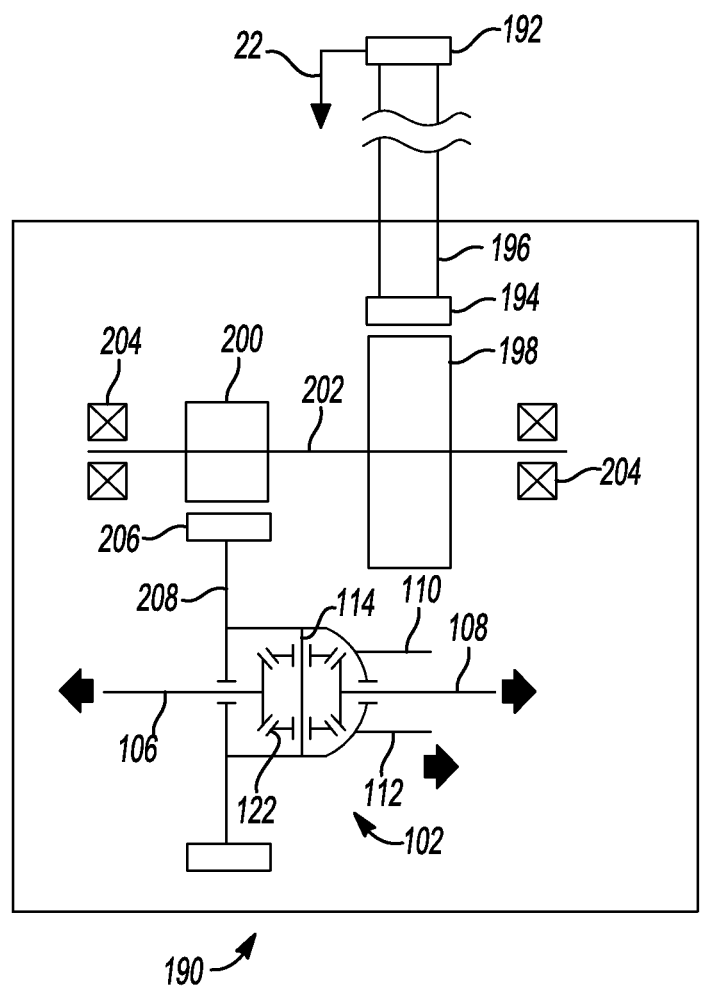
FIG. 3 is illustrates an alternative transfer mechanism for the transmission shown in FIG. 1 in accordance with the principles of the present invention.

In another arrangement, the two-axis chain mechanism 90 is replaced by a three-axis gear transfer mechanism 190 shown in FIG. 3. The transfer mechanism 190 includes a set of gears 192, 194, and 196 that are coupled to a large ring gear 198. The large ring gear 198 is attached to a shaft 202 supported by a set of bearings 204. A smaller ring gear 200 is also attached to the shaft 202 such that there is a multiplier effect between the large ring gear 198 and the small ring gear 200. Torque is transmitted from the gear 200 to another gear 206 which in turn rotates a shaft or member 208. The shaft or member 208 is connected to the pinion/gear assembly 102. The components and operation of the pinion/gear assembly 102 is the same as that described above with reference to the two-axis-chain transfer mechanism.

The description of the invention is merely exemplary in nature and variations that do not depart from the gist of the invention are intended to be within the scope of the invention. Such variations are not to be regarded as a departure from the spirit and scope of the invention.

What is claimed is:

1. A multi-speed transmission for a motor vehicle comprising:
   an input member and an output member;
   a plurality of planetary gear assemblies, at least one of the plurality of planetary gear assemblies being coupled to the input member and at least another of the plurality of gear assemblies being coupled to the output member;
   a plurality of torque-transmitting mechanisms that are selectively engageable to establish at least ten forward speed ratios and at least one reverse speed ratio with the plurality of gear assemblies and between the input and output members;
   a torque converter coupled to the input member, the torque converter providing input torque to the input member; and
   a transfer mechanism coupled to the output member with a pair of sprockets connected together with a chain, output torque being transmitted to the transfer mechanism through the output member, the transfer mechanism including a differential assembly that provides front-wheel drive and all-wheel drive modes to the motor vehicle,
   wherein the transfer mechanism includes a planetary gear set that includes a planetary gear set that couples one of the pair of sprockets to the differential assembly.

2. The multi-speed transmission of claim 1 wherein the plurality of planetary gear assemblies is four planetary gear assemblies.

3. The multi-speed transmission of claim 2 wherein each planetary gear assembly includes a sun gear member, a ring gear member, and a planet gear carrier member that supports a set of planet gears.

4. The multi-speed transmission of claim 1 wherein the plurality of torque-transmitting mechanisms is seven torque-transmitting mechanisms.

5. The multi-speed transmission of claim 1 wherein a first group of the plurality of torque-transmitting mechanisms are brakes and a second group of the plurality of torque-transmitting mechanisms are clutches.

6. The multi-speed transmission of claim 1 wherein various combinations of two engaged toque-transmitting mechanisms establishes a specific speed ratio.

7. The multi-speed transmission of claim 1 wherein the torque convertor is a starting device that includes a torus connected to a motor vehicle engine with a shaft.

8. The multi-speed transmission of claim 7 wherein the torus is connected to a stator through a one-way clutch to insure that the torus rotates in only one direction.

9. The multi-speed transmission of claim 7 wherein the starting device includes a dual spring/damper coupled to the torus with a clutch to minimize the transmission of vibrations to the multi-speed transmission.

10. The multi-speed transmission of claim 9 wherein torque from the engine is transmitted to the multi-speed transmission when the clutch is engaged.

11. The multi-speed transmission of claim 7 wherein the starting device includes a fluid clutch that is subjected to a slip effect.

12. The multi-speed transmission of claim 1 wherein the planetary get set includes a sun gear member, a ring gear member, and a planet gear carrier member that supports a set of planet gears, the sun gear member being connected for common rotation with an interconnecting member that is connected to the one of the pair of sprockets, the ring gear member being connected to a housing for the multi-speed transmission, and the planet carrier member being connected for common rotation with the differential.

13. The multi-speed transmission of claim 1 wherein the differential is a pinion/gear assembly.

14. A multi-speed transmission for a motor vehicle comprising:
- an input member and an output member;
- a plurality of planetary gear assemblies, at least one of the plurality of planetary gear assemblies being coupled to the input member and at least another of the plurality of gear assemblies being coupled to the output member;
- a plurality of torque-transmitting mechanisms that are selectively engageable to establish at least ten forward speed ratios and at least one reverse speed ratio with the plurality of gear assemblies and between the input and output members;
- a torque converter coupled to the input member, the torque converter providing input torque to the input member; and
- a transfer mechanism coupled to the output member with a three-axis gear transfer mechanism, the gear transfer mechanism including a set of gears coupled to a first ring gear connected to a second ring gear with a shaft, the second ring gear being smaller than the first ring gear, output torque being transmitted to the transfer mechanism through the output member, wherein the transfer mechanism includes a differential assembly that provides front-wheel drive and all-wheel drive modes to the motor vehicle.

15. The multi-speed transmission of claim 14 wherein torque is transmitted from the second ring gear to another gear connected to the differential with a shaft.

16. The multi-speed transmission of claim 15 wherein the differential is a pinion/gear assembly.

* * * * *